Figure 1:
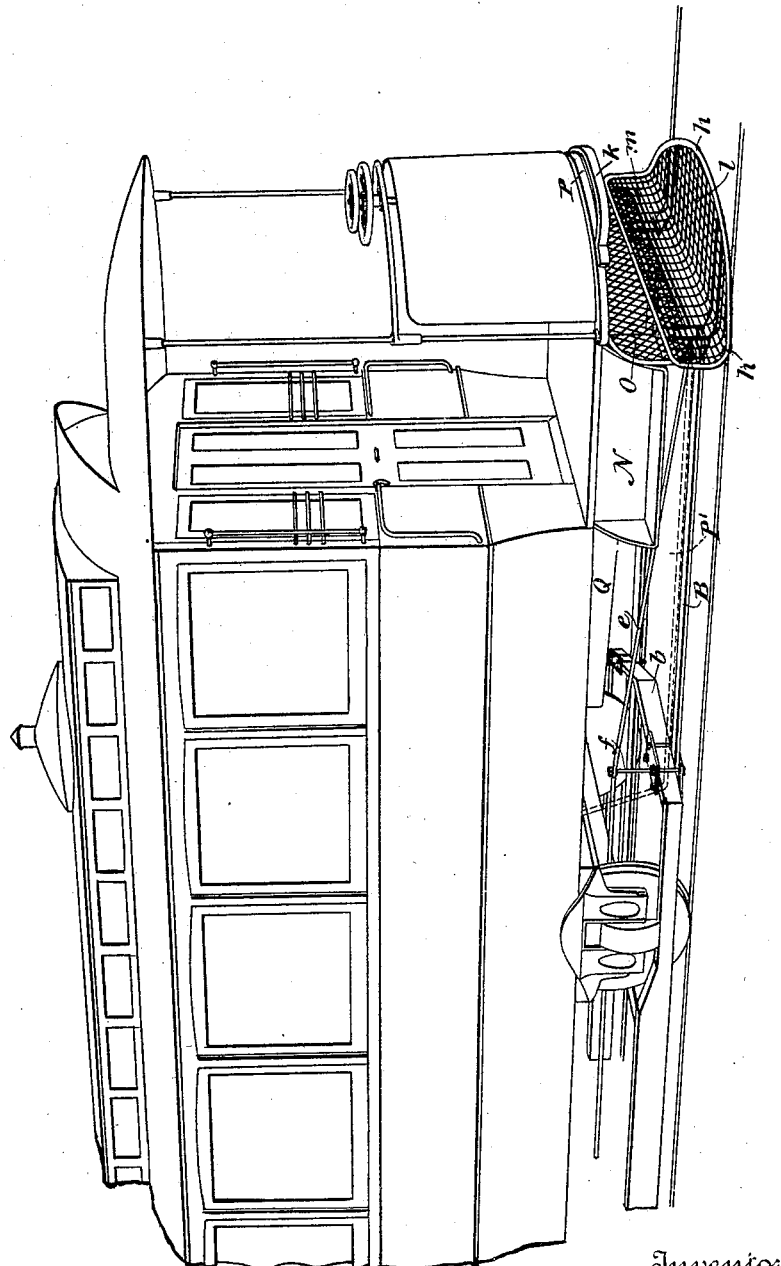

(No Model.) 3 Sheets—Sheet 1.

A. M. PHELPS.
SAFETY GUARD AND TRUCK FOR CARS, &c.

No. 599,629. Patented Feb. 22, 1898.

Witnesses
Edward Thorpe
Chas. E. Peters

Inventor
Abel M. Phelps
By his Attorney (No Model.) 3 Sheets—Sheet 2.
A. M. PHELPS.
SAFETY GUARD AND TRUCK FOR CARS, &c.
No. 599,629. Patented Feb. 22, 1898.
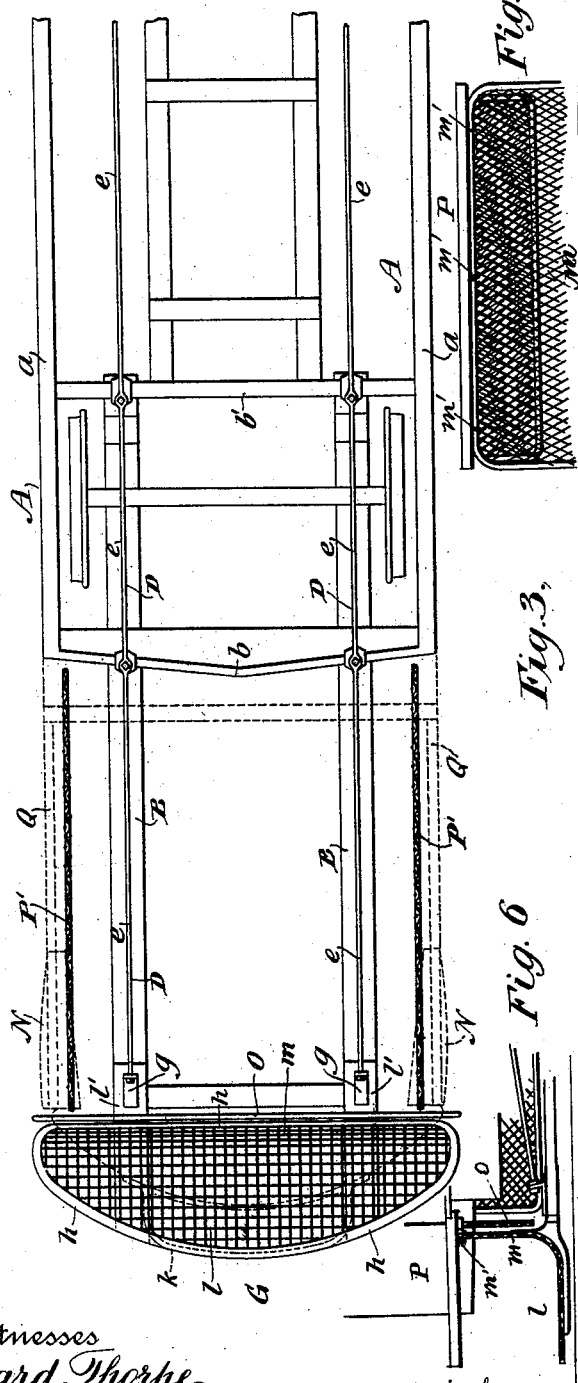
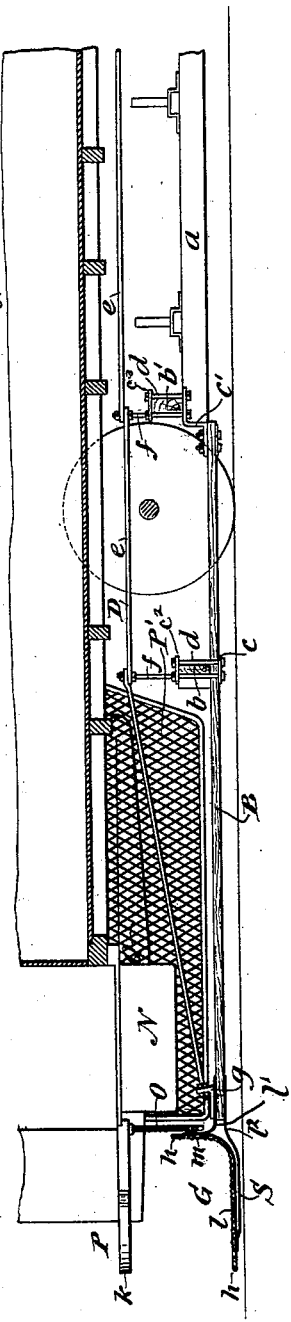
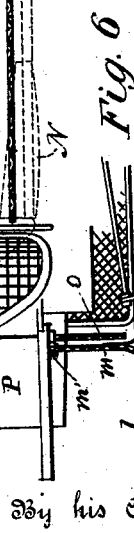
Witnesses
Edward Thorpe
Chas. E. Peters
Inventor
Abel M. Phelps
By his Attorney (No Model.) 3 Sheets—Sheet 3.
A. M. PHELPS.
SAFETY GUARD AND TRUCK FOR CARS, &c.
No. 599,629. Patented Feb. 22, 1898.
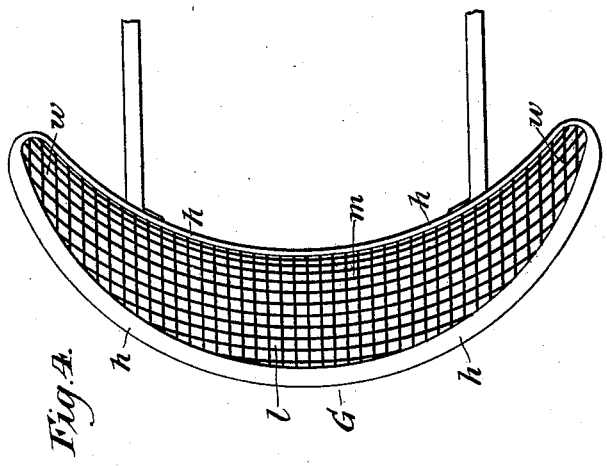
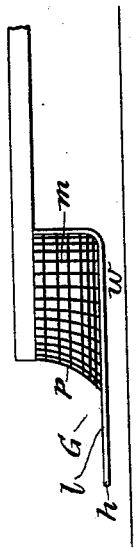
Witnesses
Edward Thorpe
Chas. E. Peters
Inventor
Abel M. Phelps
By his Attorney

UNITED STATES PATENT OFFICE.

ABEL MIX PHELPS, OF NEW YORK, N. Y.

SAFETY GUARD AND TRUCK FOR CARS, &c.

SPECIFICATION forming part of Letters Patent No. 599,629, dated February 22, 1898.

Application filed January 8, 1894. Renewed November 26, 1895. Serial No. 570,239. (No model.)

*To all whom it may concern:*

Be it known that I, ABEL MIX PHELPS, a citizen of the United States, residing at New York city, in the county of New York and State of New York, have invented certain new and useful Improvements in Safety Guards and Trucks for Cars and other Vehicles and Motors; and I do hereby declare the following to be a full, clear, and exact description of the invention, such as will enable others skilled in the art to which it appertains to make and use the same.

This invention relates to guards, fenders, and other protective appliances for steam, electric, and other motors, cable traction, trolley, and other cars and vehicles, which have for their object to prevent persons who have fallen or been run down from being killed or injured by being carried under the wheels or crushed and mutilated by the projecting parts of the platform or parts of the truck and motor or grip attachments about the body of the car or other vehicle; and its object is to construct a fender which shall be simple and economical and at the same time highly efficient in operation.

In the accompanying drawings I have illustrated a structure and various modifications thereof, and with reference to these structures have described my invention. It is to be understood, however, that I do not herein limit myself to the forms illustrated in the drawings, but consider to be within the scope of my invention any equivalents for performing the same or substantially the same functions.

Figure 1 is a perspective view of a car provided with my improved fender. Fig. 2 is a plan of one end of a car-truck provided with said guard. Fig. 3 is a sectional side elevation of one end of a car-truck and part of a car-body, showing said guard and the attachments or additions to the truck to adapt it to support the guard. Figs. 4 and 5 are respectively plan and side elevations of a modification of the guard. Fig. 6 is a sectional view of a modification. Fig. 7 is a front view of the upper part of Fig. 6.

Referring to the drawings, A is one end of a truck for cars to which the invention is to be applied. This may be of any well-known construction, only the parts essential to the explanation of my invention as illustrated in the type of truck here shown being here enumerated, these being the side members $a\ a$ and transverse members $b\ b'$, which inclose the wheels and are connected with the car-body and with the axle-boxes and yokes in the usual manner, but by devices and contrivances not shown, as the construction and arrangement of these trucks are well known to those skilled in the art. To adapt these trucks to support a safety-guard, I add to them a suitable truss-like structure, which may be constructed and arranged in various ways, my invention not being limited to any particular form or construction of this supporting structure; but for simplicity, lightness, and economy I prefer the construction illustrated in Figs. 2 and 3. This consists of struts B B, preferably made of light material and connected with the transverse members $b\ b'$ of the truck, (inside the wheels in this form of truck, but outside in some other forms,) and connected with the said truck by clamps $c$ for the front connections and angular plates $c'$ for the rear connections. Through these plates bolts $d\ d$ are passed, one or more on each side of the members $b\ b'$, and their upper ends are also passed through plates $c^2\ c^3$ on top of the said members and secured by suitable burs. The struts B B and the truck-frame form the tie-beam of the truss structure for supporting the guard. The truss-beams D D are composed of one or more rods $e\ e$, &c., which pass over and are secured to two or more posts $f\ f$, rising from the transverse members of the truck, to which their lower ends are secured. These truss-beams D D are continuous and extend from the ends of the struts B B at one end of the car over posts $f\ f$, rising from the truck on each side of the wheels at the corresponding end, to similar rods (not shown) rising from the truck on each side of the wheels at the opposite end and thence down to the ends of the struts at that end of the car. Thus the truss-beams being continuous combine with the truck and the struts to form a supporting structure for the guard at each end of the car. When both ends are to be provided with guards and the truck forms an essential element in the structure, the supporting structure is thereby greatly simplified in construction, as the necessary parts of the truck enter into and form part of the supports and lessen the number of parts required to form the support, thus economizing material and lessening the added weight considerably. The ends of the trussbeams D D are bolted to plates $g$ $g$ at the ends of the struts.

The guard G consists of a frame $h$, shaped to form a horizontal portion and an upwardly-curved portion $i'$. (See Fig. 3.) Horizontally the part $i$ is shaped to conform to the end of the car or platform. In this instance the end of the platform P is semi-elliptical or crescent-shaped, as indicated by the dotted lines, Fig. 2, and to the front of the curved platform is added a buffer $k$. The frame of the safety-guard thus conforms to the shape of the platform. The framework of the guard is covered with wire-netting, which by suitable and well-known means is woven and applied so as to follow the upward curvature of the frame and thus form a horizontal apron $l$ and an upright fender $m$, which rises toward the bottom of the platform, but, as shown in Figs. 2 and 3, does not connect with the bottom in this instance, although it may be made to do so, if preferred, as illustrated in Figs. 6 and 7. In these figures, $m'$ $m'$ represent hooks which may be used to connect the frame with the bottom of the car.

The framework of the guard is made sufficiently wide for the guard to be extended on both sides to the outer lines of the steps leading to the platform, which are indicated at N N by dotted lines. In this way the apron and fender are made to extend to and in front of the steps, so that it will be impossible for a person falling or run down in front of the car to be carried under the steps, for the reason that the fender $m$ rises above the bottom of the steps.

The guard is connected with the ends of the supporting structure by plates $l'$ $l^2$, bolted to the ends of the struts B B. Plate $l'$ is curved upward, and the frame or the upper straight portion thereof is bolted to the plates $l'$. Plates $l^2$ $l^2$ are curved downward underneath the guard, and the frame of the guard is bolted to these plates, which form shoes S under the guard on either side between the tracks, which in case of any obstructions or unevenness in the road-bed, such as upwardly-projecting stones, &c., will come in contact with the same and thereby protect the netting of the guard from injury. Behind the fender $m$ and close to it a wire-netting frame O, connected with the bottom of the platform, depends and overlaps the fender and forms substantially an extension of the fender to the bottom of the platform, and which also extends laterally as far as the guard and around the sides of the car, if preferred. This frame completely covers the space between the fender and the bottom of the platform and makes it impossible for a body caught on the apron to be thrown or carried back and dropped behind the guard, where it would be exposed to injury by the low-hanging parts of the truck or carried under the wheels. As this frame is connected with the platform or car-body, it partakes of the swaying, tilting, rising, falling, and vibrating motions of the car-body; but these movements are not sufficient to at any time cause it to pass above the line of the fender. Furthermore, on either side are dependent screens P' P', which extend downward inside the boards Q Q, extending from the forward ends of the steps N N backward to the ends of the trucks. The side screens are connected with the body of the car and play up and down with it inside of said boards and outside of the struts B B and thus furnish side guards. These boards may connect at the rear ends with the trucks and at the forward ends with the platform or be otherwise attached and held in position.

The guard above described is designed to prevent a person falling in front of a moving car or knocked down by the same from being carried under the car and exposed to injury by the crushing, rolling, or pinching action against the road-bed or tracks by those parts of the car such as the steps, car-body, truck-frame, &c. This may be effected by connecting the guard with the truck as above described, whereby it moves at all times and under all circumstances at the same level or height above the road-bed and tracks. The horizontal apron $l$ may be located so close to the tracks that it will pass under and pick up a person toward whom it is moving. No matter how violently the body may be lifted it cannot be carried behind the guard, because the fender with its extension O prevents it. If the body should be only partially across the track or should fall sidewise toward the guard, so that the latter would only pass under and lift the part lying on or between the tracks, there would be no danger of the body passing under the steps or wheels, as the guard extends to or beyond the steps and it would either throw the body to one side clear of the steps and wheels or else would carry it along with it until the car stopped without liability of the part not resting on the apron passing under the steps or wheels. The depth of the apron from front to back is sufficient to comfortably receive and carry the body of a full-grown man, and the distance from the apron to the bottom of the platform is such that the body can be carried under the platform and onto the apron without danger of its being injured by the movement of the car-body.

Many modifications of the structure above described may be devised without departing from the scope of my invention, some of which I have shown. In Figs. 4 and 5 the fender $m$ is curved to a semi-elliptical form, so as to form a prow $p$, Fig. 5, with wings $w$ $w$, the object of this construction being to adapt the guard to throw a person sidewise clear of the track in case of striking him at such an angle and with such violence that he could not be caught on the apron.

It is obvious that instead of using a separate frame O the netting may extend directly up to the car-body in one piece, and, if preferred, the flat portion *l* may be dispensed with. In this construction the vertical frame *h* is carried by the struts B, and, if preferred, may extend around the sides of the car, as illustrated. The flexible netting extends across the frame. It is further obvious that it is often desirable that the fender shall extend beyond the platform of the car, and I intend that my claims as drawn shall cover a structure which extends beyond the platform as well as one which extends as far as the same.

It is to be understood that although I have described my improved guard as being supported by the "trucks" or "truck-frame" I consider herein that these terms cover any non-vibrating or substantially non-vibrating part of the car, and I have consequently used the term "non-vibrating" in this connection to cover the wheels, axles, axle-boxes, trucks, truck-frames, &c., as well as any part of the car which is not substantially affected by the motion of the car-body. Furthermore, I consider it to be within the scope and spirit of my invention and claims, as hereinafter set forth, to locate the guard herein described and claimed upon any part of the car, sides as well as front, it being obvious, for instance, that a screen may be carried upon the struts B B as well as by the sides of the car-body to form substantially the same guard at the sides of the car as is shown upon the front part thereof.

Having thus described my invention, I claim—

1. A safety-guard for railway-cars comprising two overlapping parts, one of which is carried by the running-gear of the car and the other by the car-body, the two parts together forming a guard which extends from the bottom of the platform to within a short distance of the track, substantially as described.

2. The combination of two overlapping guards for the end or ends of a car or other vehicle, a car-truck, struts connecting the said truck with one of the guards, the said truck and struts forming a support therefor, and the other of said guards being carried by the car-body, substantially as described.

3. A safety-guard comprising two overlapping parts, one carried by the running-gear of the car and the other carried by the car-body, both parts together forming a guard adapted to protect the platform of the car, as set forth.

4. The combination in a safety-guard for cars and other vehicles, of an apron and fender supported by suitable means from the truck of the car so as to be unaffected by the movements of the car-body, and an additional fender connected with the bottom of the platform and overlapping the fender connected with the apron, so as to move with the car-body, but not to the extent of separating from the apron and fender, substantially as described.

5. A safety-guard comprising two overlapping parts, one carried by the running-gear of the car and the other carried by the car-body, both parts together forming a guard extending across the front of the platform of the car, and one or more independent parts at the sides of the car-body, whereby all of said parts will coact to protect the platform, sides and wheels of the car, substantially as described.

6. The combination with the non-vibrating part of the car, of a substantially horizontal fender supported thereby, and a flexible guard extending from the rear of said fender upward substantially to the car-body, whereby the passage of a body between said guard and the car-body will be prevented, substantially as described.

7. The combination with the non-vibrating part of the car, of a substantially vertical fender-frame carried thereby and extending upward substantially to the car-body whereby the passage of a body between the fender-frame and the car-body will be prevented, and a body of flexible material extending across said frame, substantially as described.

8. The combination with the non-vibrating part of the car, of a strut or struts fixed thereto, a substantially vertical fender-frame carried by said strut or struts and extending upward substantially to the car-body whereby the passage of a body between the fender-frame and the car-body will be prevented, and a body of flexible material extending across said frame, substantially as described.

9. The combination with the non-vibrating part of the car, of a substantially vertical fender-frame carried thereby and extending upward substantially to the car-body and connected therewith, whereby the passage of a body between the fender-frame and the car-body will be prevented and a body of flexible material extending across said frame, substantially as described.

10. The combination with the non-vibrating part of the car, of a strut or struts fixed thereto and extending substantially as far as the platform of the car, a substantially crescent-shaped frame carried by said strut or struts and having an upwardly-curved rear portion, and a netting of flexible material extending across said frame, substantially as described.

11. The combination with the non-vibrating part of the car, of a strut or struts fixed thereto and extending substantially as far as the platform of the car, a substantially crescent-shaped frame having an upwardly-curved rear portion, carried by said strut or struts, and a flexible netting loosely extending across said frame, substantially as described.

12. The combination with the non-vibrating part of the car, of a strut or struts fixed thereto and extending substantially from end to end of the car, a supporting rod or rods extending substantially from end to end of said strut or struts and supported intermediate its extremities by said non-vibrating part of the car, and a fender or fenders carried by said strut or struts, substantially as described.

In testimony that I claim the invention above set forth I affix my signature in presence of two witnesses.

ABEL MIX PHELPS.

Witnesses:
FREDK. HAYNES,
WILTON C. DONN.